United States Patent
Yang et al.

(10) Patent No.: US 6,555,623 B1
(45) Date of Patent: Apr. 29, 2003

(54) PREPARATION OF UNSATURATED POLYESTERS

(75) Inventors: Lau S. Yang, Wilmington, DE (US); Paul Malcolm Puckett, Lake Jackson, TX (US); Lawrence J. Karas, West Chester, PA (US); Diandre Armstead, Gilbertsville, PA (US); Paul A. Albano, Gibbstown, NJ (US)

(73) Assignee: Arco Chemical Technology, L.P., Greenville, DE (US)

( * ) Notice: Subject to any disclaimer, the term of this patent is extended or adjusted under 35 U.S.C. 154(b) by 0 days.

(21) Appl. No.: 10/100,152

(22) Filed: Mar. 18, 2002

(51) Int. Cl.$^7$ ................................................ C08L 67/06
(52) U.S. Cl. ...................... 525/168; 528/302; 528/306; 528/308; 528/308.6; 525/437; 525/445
(58) Field of Search ..................... 528/302, 306, 528/308, 308.6; 525/437, 445, 168

(56) References Cited

U.S. PATENT DOCUMENTS

| | | | |
|---|---|---|---|
| 5,677,396 A | 10/1997 | Klang | 525/445 |
| 5,854,359 A | 12/1998 | Yang | 525/444 |
| 5,880,225 A | 3/1999 | Yang et al. | 525/440 |
| 6,492,487 B1 * | 12/2002 | Yang et al. | 528/272 |

OTHER PUBLICATIONS

B. C. Trivedi and B. M. Culbertson, *Indus. Eng. Chem. Prod. Res.Dev. 3 (3), 218* (1964).

* cited by examiner

*Primary Examiner*—Samuel A. Acquah
(74) *Attorney, Agent, or Firm*—Shao Guo

(57) ABSTRACT

A process for making unsaturated polyesters from 2-methyl-1,3-propanediol (MPD) is disclosed. The process comprises reacting one equivalent of an aromatic diacid with about two equivalents of MPD to produce an ester diol and then reacting one equivalent of the ester diol with from about 1.1 to about 1.9 equivalents of maleic anhydride to produce the polyester. The polyester has a fumarate/maleate ratio of 90/10 or greater.

24 Claims, No Drawings

PREPARATION OF UNSATURATED POLYESTERS

FIELD OF THE INVENTION

The invention relates to the preparation of unsaturated polyesters from 2-methyl-1,3-propanediol (MPD). In particular, the unsaturated polyester prepared has a high fumarate content.

BACKGROUND OF THE INVENTION

Unsaturated polyesters are condensation polymers with a polyester backbone formed from a glycol and an unsaturated diacid. Commonly used unsaturated diacids are maleic acid, fumaric acid, and maleic anhydride. Even though fumaric acid offers many advantages in production of unsaturated polyesters, it is seldom used because it is expensive. Saturated diacids are often used with the unsaturated diacid to control the degree of unsaturation and to modify the physical properties of the resulting polyester. For instance, the inclusion of phthalic anhydride reduces the tendency of the unsaturated polyester to crystallize and thereby improves its solubility in styrene.

Unsaturated polyesters are crosslinked, through the unsaturation, with ethylenic monomers such as styrene. To cure well with styrene, the unsaturated polyester needs a high degree of fumarate unsaturation (fumarate/maleate ratio greater than 90/10). Maleate-containing polyesters do not readily cure with styrene. However, most unsaturated polyesters are commercially made from maleic anhydride. Thus, it is crucial to effectively isomerize maleate to fumarate during the condensation polymerization.

Many glycols are used for making unsaturated polyesters. Examples are ethylene glycol, diethylene glycol, propylene glycol, dipropylene glycol, and neopentyl glycol. The degree of isomerization of maleate to fumarate largely depends on the glycol used. In general, the use of a primary glycol leads to a low degree of isomerization, while the use of a secondary glycol leads to a high degree of isomerization. For instance, the esterification of maleic anhydride with neopentyl glycol, ethylene glycol, and propylene glycol gives fumarate/maleate ratios of 50/50, 75/25, and 93/7, respectively. See *Ind. Eng. Chem. Prod. Res. Dev.* 3(3), 218 (1964). Although propylene glycol gives a high fumarate content, it has lower reactivity toward condensation and the resultant unsaturated polyester often has a dark color and poor appearance.

2-Methyl-1,3-propanediol (MPD) became commercially available only within the last decade. It is an easily handled liquid, it has a high boiling point, and it has two primary hydroxyl groups for rapid condensation. However, like other primary glycols, MPD disadvantageously gives unsaturated polyesters having low fumarate/maleate ratios (60/40 to 70/30). Many efforts have been made to increase the fumarate content of unsaturated polyesters made from MPD. One approach is to increase the polymerization temperature. However, increasing reaction temperature often causes color problems in the product.

Co-pending application Ser. No. 09/946,326 teaches a process for making unsaturated polyesters from MPD that have fumarate/maleate ratios greater than 85/15. However, the process requires the use of propylene glycol to boost the isomerization of maleate to fumarate in a late stage of the polymerization. In sum, a better way to make a MPD-based unsaturated polyester is needed. Ideally, the unsaturated polyester would have a high fumarate content.

SUMMARY OF THE INVENTION

The invention is a process for making unsaturated polyesters from 2-methyl-1,3-propanediol (MPD). The process comprises two steps. First, one equivalent of an aromatic dicarboxylic acid derivative reacts with about two equivalents of 2-methyl-1,3-propanediol (MPD) to produce an ester diol.

Second, one equivalent of the ester diol reacts with from about 1.1 to about 1.9 equivalents of maleic anhydride. We surprisingly found that the resultant unsaturated polyester has a fumarate/maleate ratio of 90/10 or grater, which is significantly higher than the conventional unsaturated polyester prepared from MPD.

The invention also provides a novel unsaturated polyester. The unsaturated polyester consists essentially of recurring units of MPD, an aromatic dicarboxylic acid, maleic acid, and fumaric acid. It has a fumarate/maleate ratio of 90/10 or greater. The unsaturated polyester gives its thermoset polymer improved heat resistance.

DETAILED DESCRIPTION OF THE INVENTION

The process of the invention comprises two steps. The first step involves reacting one equivalent of an aromatic dicarboxylic acid derivative with about two equivalents of 2-methyl-1,3-propanediol (MPD) to produce an ester diol. Suitable aromatic dicarboxylic acid derivatives include at least one aromatic ring and two carboxy functional groups (acids, esters, acid halides, anhydride). Examples include unsubstituted and substituted phthalic anhydrides, isophthalic acids, terephthalic acids, dialkyl terephthalates, and the like. Particularly preferred, because of their low cost and commercial availability, are phthalic anhydride, isophthalic acid, terephthalic acid, and dimethyl terephthalate. Suitable aromatic dicarboxylic acid derivatives also include recycled polyesters, especially thermoplastic polyesters such as polyethylene terephthalate (PET) or polybutylene terephthalate (PBT).

The aromatic dicarboxylic acid and MPD are preferably reacted at a temperature within the range of about 175° C. to about 225° C., more preferably from about 185° C.to about 215° C., and most preferably from about 195° C. to about 210° C. One advantage of the invention is that a high reaction temperature is not needed in the first step because MPD has two primary hydroxyl groups that react rapidly with the aromatic dicarboxylic acid derivatives. Lower reaction temperature gives a product with lighter color and better appearance.

Preferably, the reaction is performed under an inert atmosphere to minimize oxidative side-reactions. This is particularly important when the reaction temperature is relatively high. Preferably, a steam-jacketed reflux condenser is used. Such a condenser allows an efficient removal of water or other volatile products from the reaction mixture but keeps MPD and other reactants in the reactor. The use of a steam-jacketed reflux condenser also helps to avoid a high temperature, which otherwise is often needed to drive water out of the reaction mixture.

Optionally, an esterification or transesterification catalyst is used in the first step to accelerate the formation of the ester diol. Suitable catalysts include organotin compounds and zinc salts such as zinc acetate, zinc propionate, butyltin oxide hydroxide, dibutyltin oxide, and phenyltin oxide hydroxide. The catalyst can be used in an amount up to about 5,000 ppm based on the amount of the unsaturated polyester.

Preferably, the catalyst is used in an amount from about 1 to about 500 ppm.

The equivalent ratio of MPD/aromatic dicarboxylic acid derivative is about 2/1 so that the ester diol has a low acid number. The ester diol preferably has an acid number less than about 15 mg KOH/g, more preferably less than about 10 mg KOH/g and most preferably less than about 5 mg KOH/g. The ester diol so produced has little or no color.

In the second step, one equivalent of the ester diol reacts with from about 1.1 to about 1.9 equivalents of maleic anhydride to produce an unsaturated polyester. Preferably, the equivalent ratio of maleic anhydride/ester diol is within the range of about 1.1/1 to about 1.8/1. More preferably, the ratio is from about 1.2/1 to about 1.5/1. While a sufficient amount of maleic anhydride is needed to introduce a high degree of unsaturation, using too much maleic anhydride reduces the fumarate/maleate ratio and thereby adversely reduces the reactivity of the unsaturated polyester (see Comparative Example 7).

The second step may be performed under essentially the same conditions as the first step. The reaction temperature is preferably within the range of about 175° C. to about 225° C., more preferably from about 185° C. to about 215° C., and most preferably from about 195° C. to about 210° C. Conventional processes for making unsaturated polyesters from MPD often need an "over-cooking", i.e., heating the reaction mixture at a temperature above 220° C., to substantially isomerize maleate to fumarate. Over-cooking often gives the product dark color and poor appearance. The process of the invention advantageously avoids over-cooking.

The catalyst from the first step may also catalyze the reaction of the second step. Alternatively, a different type or an additional amount of catalyst may be added. Suitable catalysts are discussed above. The reaction is preferably performed under an inert atmosphere to minimize oxidative side-reactions.

Optionally, the process comprises a third step, in which the unsaturated polyester from the second step is capped with a capping agent. "Capping" means reacting the terminal acid groups of the unsaturated polyester with a capping agent. Suitable capping agents include alcohol, glycol, olefin, monoamine, diamine, and the like, and mixtures thereof. Capping is particularly useful when the unsaturated polyester from the second step contains a high acid concentration. Reducing the acid number can reduce the viscosity of the unsaturated polyester.

Suitable alcohols for capping include $C_4$ to $C_{10}$ alcohols. Sterically bulky alcohols, such as 2-ethylhexan-1-ol, 2-methylhexan-2-ol, 3-methylpentan-3-ol, 2-methylpentan-2-ol, 3-methyl-2-butanol, 2-methylbutan-2-ol, and 3-methyl-2-butanol, are preferred. Suitable alcohols can also be ethylenically or acetylenically unsaturated, for example, 2-methyl-3-buten-2-ol and 3-methyl-1-penten-3-ol. Suitable glycols include ethylene glycol, propylene glycol, diethylene glycol, dipropylene glycol, 1,2-butanediol, 1,3-butanediol, 1,5-pentanediol, 1,6-hexanediol, MPD, 2,2-dimethyl-1,3-propanediol, cyclohexane-1,4-dimethanol, and neopentyl glycol, the like, and mixtures thereof. We have found that capping the unsaturated polyester does not change the fumarate/maleate ratio.

The invention includes an unsaturated polyester. The unsaturated polyester consists essentially of recurring units of MPD, an aromatic dicarboxylic acid, maleic acid, and fumaric acid, wherein the ratio of fumarate to maleate is 90/10 or greater. Preferably, the ratio of fumarate/maleate is about 95/5 or greater. More preferably, the ratio of fumarate/maleate is about 98/2 or greater. The higher the ratio of fumarate to maleate, the more reactive the unsaturated polyester. Usually, using MPD as a sole glycol produces unsaturated polyesters having fumarate/maleate ratios of only about 80/20 or lower. See Comparative. Example 19. These unsaturated polyesters are very difficult to cure. See application Ser. No. 09/946,326.

Preferably, the unsaturated polyester has a number average molecular weight from about 800 to about 5,000. More preferably, the molecular weight is from about 1,000 to about 4,000. Most preferably, the molecular weight is from about 1,500 to about 2,500. Preferably, the unsaturated polyester has a molecular weight distribution of less than about 5, more preferably less than about 4 and most preferably less than about 3. The narrower the molecular weight distribution, the lower the viscosity of the polyester.

The unsaturated polyester of the invention can be made by the process discussed above. In the first step, one equivalent of an aromatic dicarboxylic acid derivative reacts with about two equivalents of MPD to produce an ester diol. In the second step, one equivalent of the ester diol reacts with from about 1.1 to about 1.9, preferably from about 1.2 to about 1.5, equivalents of maleic anhydride to produce the unsaturated polyester. Optionally, the unsaturated polyester from the second step is capped with MPD. Capping with MPD increases the content of MPD recurring units in the polyester and reduces the acid number. Capping may also involve a chain extension and thereby increases the molecular weight of the polyester. However, capping does not reduce the fumarate/maleate ratio of the polyester.

Suitable aromatic dicarboxylic acids are discussed above. One example is isophthalic acid. We have surprisingly found that the isophthalic acid-based unsaturated polyester of the invention has a lower viscosity in styrene than the conventional analogue. Moreover, the thermoset polymer made from the unsaturated polyester has an improved heat-resistance, measured by DTUL (distortion temperature under load). See Table 1.

The unsaturated polyester can be free-radically cured with a vinyl monomer. Suitable vinyl monomers and free-radical initiators are described in U.S. Pat. No. 5,677,396, the teachings of which are incorporated herein by reference. Examples of vinyl monomers include unsubstituted and substituted vinyl aromatics, vinyl esters of carboxylic acids, acrylates, methacrylates, hydroxyalkyl acrylates, hydroxyalkyl methacrylates, acrylamides, methacrylamides, acrylonitrile, methacrylonitrile, alkyl vinyl ethers, allyl esters of aromatic di- and polyacids, and the like, and mixtures thereof. Preferred vinyl monomers are vinyl aromatics, halogenated vinyl aromatics, methacrylic acid esters, and diallyl esters of aromatic di- and polyacids. Particularly preferred vinyl monomers are styrene, vinyl toluene, methyl methacrylate, and diallyl phthalate.

Generally, the amount of vinyl monomer used will be within the range of about 10 to about 70 wt % based on the amount of cured thermoset. A more preferred range is from about 20 to about 65 wt %. Most preferred range is from 25 wt % to 50 wt %. The amount of vinyl monomer is altered to adjust the viscosity of the solution. A workable viscosity depends on the fabrication process. In general, the viscosity is preferably from about 100 to 2000 cps and more preferably from about 200 to about 600 cps.

Typically, a mixture of unsaturated polyester and vinyl monomer is combined with a free-radical initiator at room or elevated temperature, and is cured to give a thermoset polymer. The thermosets are often used to form composite materials. A composite usually comprises a thermoset polymer and organic or inorganic fillers including particles, pigments, and fibers (glass, carbon, nylon, and cotton).

The following examples merely illustrate the invention. Those skilled in the art will recognize many variations that are within the spirit of the invention and scope of the claims.

EXAMPLE 1

Preparation of High Fumarate Unsaturated Polyester Using MPD as the Only Glycol

A. Preparing Diester Diol

A four-liter reactor equipped with a mechanical stirrer, nitrogen inlet, and steam-jacketed condenser is charged with dimethyl terephthalate (1940 grams, 10 moles), 2-methyl-1,3-propanediol (MPD) (1800 grams, 20 moles), and zinc acetate (0.56 gram). The mixture is heated to 210° C. for about 7 hours, producing about 640 grams of methanol. The resultant diester diol is clear and colorless, and has a hydroxyl number of about 350 mg KOH/g and a hydroxyl equivalent weight of 310.

B. Reacting Diester Diol with Maleic Anhydride

A two-liter reactor equipped with a mechanical stirrer, nitrogen inlet, and steam-jacketed condenser is charged with the diester diol from Step A (930 grams) and maleic anhydride (441 grams). The molar ratio of maleic anhydride to diester diol is 1.5. The mixture is heated to 210° C. for 7 hours. The resultant unsaturated polyester has a fumarate/maleate ratio of 98/2.

EXAMPLE 2

Capping Unsaturated Polyester with MPD

A two-liter reactor equipped with a mechanical stirrer, nitrogen inlet, and steam-jacketed condenser is charged with the unsaturated polyester from Example 1 (1371 grams) and MPD (169 grams). The mixture is heated to 210° C. for an additional 6 hours. The capped unsaturated polyester has the same fumarate/maleate ratio (98/2) and has a solution viscosity of 430 cps in styrene at 45% styrene content.

EXAMPLE 3

Using Molar Ratio of Maleic Anhydride to Diester Diol of 1.2

The general procedure of Example 1 is followed, but 354 grams of maleic anhydride is used in Step B. The molar ratio of maleic anhydride to diester diol is 1.2. The unsaturated polyester has a fumarate/maleate ratio of 98/2.

EXAMPLE 4

Capping Unsaturated Polyester with PG

A two-liter reactor equipped with a mechanical stirrer, nitrogen inlet, and steam-jacketed condenser is charged with the unsaturated polyester from Example 3 (1284 grams) and propylene glycol (PG) (72 grams). The mixture is heated 210° C. for an additional 6 hours. The capped unsaturated polyester has the same fumarate/maleate ratio (98/2) and has a solution viscosity of 400 cps in styrene at 45% styrene content.

EXAMPLE 5

Using Molar Ratio of Maleic Anhydride to Diester Diol of 1.1

The general procedure of Example 1 is followed, but 310 grams of the diester diol and 108 grams of maleic anhydride are used in Step B. The molar ratio of maleic anhydride to diester diol is 1.1. The reaction in Step B is carried out for 12 hours; the unsaturated polyester has a fumarate/maleate ratio of 96/4.

COMPARATIVE EXAMPLE 6

Adding MPD in Step B of Example 1

The general procedure of Example 1 is followed, but in Step B, the reactor is charged with 930 grams of diester diol, 441 grams of maleic anhydride, and 169 grams of MPD. The mixture is heated for 11 hours at 210° C. The unsaturated polyester has a fumarate/maleate ratio of only 89/11. It has a solution viscosity of 800 cps in styrene at 45% styrene.

This example shows that using MPD in the step B gives a lower fumarate/maleate ratio.

COMPARATIVE EXAMPLE 7

Using Molar Ratio of Maleic Anhydride to Diester Diol of 2.0

The general procedure of Example 1 is followed. In Step A, a mixture of 144 grams of MPD, 166 grams of terephthalic acid, and 0.45 gram of butyltin oxide is heated at 210° C. for 10 hours. The resultant diester diol has a hydroxyl number of 240 mg KOH/g.

In Step B, 118 grams of maleic anhydride is added to the diester diol from Step A. The molar ratio of maleic anhydride to diester diol is 2.0. The mixture is heated at 210° C. for 6 hours. The unsaturated polyester has a fumarate/maleate ratio of only 89/11.

This example shows that using too much acid in step B reduces the fumarate/maleate ratio.

EXAMPLE 8

Using MPD as the Only Glycol

The general procedure of Example 1 is followed. In Step A, a mixture of MPD (576 grams) and isophthalic acid (664 grams) is heated at 210° C. for 10 hours.

In Step B, maleic anhydride (392 grams) is added to the diester diol and the mixture is heated at 210° C. for 6 hours. The unsaturated polyester has a fumarate/maleate ratio of 95/5.

EXAMPLE 9

Capping Unsaturated Polyester with MPD

MPD (169 grams) is added to the unsaturated polyester of Example 8. The mixture is heated at 210° C. for 6 hours. The capped unsaturated polyester has the same fumarate/maleate ratio (95/5) and has a solution viscosity of 250 cps in styrene at 45% styrene content.

EXAMPLE 10

Using MPD as the Only Glycol

The general procedure of Example 1 is followed. In Step A, a mixture of MPD (648 grams) and isophthalic acid (664 grams) is heated at 210° C. for 10 hours In Step B, maleic anhydride (470 grams) is added to the diester diol and the mixture is heated at 210° C. for 6 hours. The unsaturated polyester has a fumarate/maleate ratio of 96/4.

EXAMPLE 11

Capping Unsaturated Polyester with MPD

MPD (252 grams) is added to the unsaturated polyester of Example 10. The mixture is heated at 210° C. for 5 hours. The capped unsaturated polyester has the same fumarate/maleate ratio (96/4) and has a solution viscosity of 350 cps in styrene at 45% styrene content.

EXAMPLE 12

Using MPD as the Only Glycol

The general procedure of Example 1 is followed. In Step A, a mixture of MPD (720 grams) and isophthalic acid (664 grams) is heated at 210° C. for 10 hours.

In Step B, maleic anhydride (588 grams) is added to the diester diol and the mixture is heated at 210° C. for 6 hours. The unsaturated polyester has a fumarate/maleate ratio of 96/4.

EXAMPLE 13

Capping Unsaturated Polyester with MPD

MPD (252 grams) is added to the unsaturated polyester of Example 12. The mixture is heated at 210° C. for 5 hours. The capped unsaturated polyester has the same fumarate/maleate (96/4) and has a solution viscosity of 350 cps in styrene at 45% styrene content.

EXAMPLE 14

Using a Mixture of MPD and Diethylene Glycol

The general procedure of Example 1 is followed. In Step A, a mixture of MPD (1356 grams), diethylene glycol (163 grams), and phthalic anhydride (669 grams) is heated at 210° C. for 6 hours.

In Step B, maleic anhydride (1502 grams) is added to the diester diol and the mixture is heated at 210° C. for 6 hours. The unsaturated polyester has a fumarate/maleate ratio of 96/4.

EXAMPLE 15

Capping Unsaturated Polyester with MPD

MPD (252 grams) is added to the unsaturated polyester of Example 14. The mixture is heated at 210° C. for 5 hours. The capped unsaturated polyester has the same fumarate/maleate ratio (96/4) and has a solution viscosity of 70 cps in styrene at 45% styrene content.

EXAMPLE 16

Using MPD as the Only Glycol

The general procedure of Example 1 is followed. In Step A, a mixture of MPD (648 grams), dimethylterephthalate (388 grams), isophthalic acid (332 grams), and zinc acetate (0.2 gram) is heated at 210° C. for 10 hours.

In Step B, maleic anhydride (470 grams) is added to the diester diol and the mixture is heated at 210° C. for 6 hours. The unsaturated polyester has a fumarate/maleate ratio of 96/4.

EXAMPLE 17

Capping Unsaturated Polyester with MPD

MPD (443 grams) is added to the unsaturated polyester of Example 16. The mixture is heated at 210° C. for 5 hours. The capped unsaturated polyester has the same fumarate/maleate ratio (96/4) and has a solution viscosity of 250 cps in styrene at 45% styrene content.

COMPARATIVE EXAMPLE 18

Conventional Preparation of Unsaturated Polyester from MPD

A two-liter reactor equipped with a mechanical stirrer, nitrogen inlet, and steam-jacketed condenser is charged with MPD (189 grams), terephthalic acid (166 grams), and butyltin oxide (0.4 gram). The mixture is heated at 210° C. for 10 hours. Maleic anhydride (98 g) is then added and the reactor contents are heated at 210° C. until the acid number has dropped to about 20 mg KOH/g. The unsaturated polyester has a fumarate/maleate ratio of only 70/30 and a solution viscosity of 350 cps in styrene at 45% styrene.

COMPARATIVE EXAMPLE 19

Conventional Preparation of Unsaturated Polyester from MPD

A two-liter reactor equipped with a mechanical stirrer, nitrogen inlet, and steam-jacketed condenser is charged with MPD (173 g), isophthalic acid (138 g), and maleic anhydride (94 g). The mixture is heated at 210° C. for 10 hours. The unsaturated polyester has a fumarate/maleate ratio of only 68/32 and a solution viscosity of 350 cps in styrene at 45% styrene.

COMPARATIVE EXAMPLE 20

Conventional Preparation of Unsaturated Polyester from MPD

A two-liter reactor equipped with a mechanical stirrer, nitrogen inlet, and steam-jacketed condenser is charged with MPD (169 grams), phthalic anhydride (123 grams), and maleic anhydride (94 grams). The mixture is heated at 210° C. for 10 hours. The unsaturated polyester has a fumarate/maleate ratio of only 84/16 and a solution viscosity of 300 cps in styrene at 45% styrene.

EXAMPLE 21

Preparation and Testing of Thermosetting Polymers

Thermosetting polymers are prepared using the unsaturated polyester from Examples 9, 11, 12, and Comparative Example 19 (C19) according to the methods disclosed in U.S. Pat. No. 5,854,359 (Examples 1-5) and U.S. Pat. No. 5,880,225 (Example 26). The physical properties of the cured thermosetting polymers are determined using ASTM test methods. Tensile strength, modulus, and elongation are determined using ASTM D-638, Type 1. Flexural strength and flexural modulus: ASTM D-790. DTUL: ASTM D-648. Results of the testing appear in Table 1. Although these unsaturated polyesters are made from the same starting materials (MPD, isophthalic acid, and maleic anhydride) in essentially the same ratio, the unsaturated polyesters of the invention (Ex. No. 9, 11, and 13) have significantly higher DTUL than the conventional unsaturated polyester (C19).

EXAMPLE 22

Conventional Preparation of Unsaturated Polyester from MPD

A two-liter reactor equipped with a mechanical stirrer, nitrogen inlet, and steam-jacketed condenser is charged with MPD (980 grams), phthalic anhydride (100 grams), and maleic anhydride (920 grams). The mixture is heated at 210° C. for 10 hours. The unsaturated polyester has a fumarate/maleate ratio of only 73/27 and a solution viscosity of 120 cps in styrene at 45% styrene.

TABLE 1

Physical Properties of Thermosetting Polymers

| Example | 9 | 11 | 13 | C19 |
|---|---|---|---|---|
| Tensile strength, psi | 12500 | 11900 | 11200 | 12131 |
| Tensile modulus, kpsi | 556 | 530 | 524 | 478 |
| Elongation, % | 3.8 | 3.6 | 3.4 | 4.21 |
| Flexural strength, psi | 22000 | 22000 | 21000 | 22450 |
| Flexural modulus, kpsi | 560 | 550 | 538 | 572 |
| DTUL, ° C. | 90 | 99 | 111 | 77 |

We claim:

1. A process comprising:

(a) reacting one equivalent of an aromatic dicarboxylic acid derivative with about two equivalents of 2-methyl-1,3-propanediol to produce an ester diol; and (b) reacting one equivalent of the ester diol with from about 1.1 to about 1.9 equivalents of maleic anhydride to produce an unsaturated polyester having a fumarate/maleate ratio of 90/10 or greater.

2. The process of claim 1 wherein the fumarate/maleate ratio is about 95/5 or greater.

3. The process of claim 1 wherein the fumarate/maleate ratio is about 98/2 or greater.

4. The process of claim 1 wherein the aromatic dicarboxylic acid derivative is selected from the group consisting of terephthalic acid, dimethyl terephthalate, isophthalic acid, phthalic anhydride, and mixtures thereof.

5. The process of claim 1 further comprising capping the unsaturated polyester with a capping agent selected from the group consisting of alcohols, glycols, olefins, amines, diamines, and mixtures thereof.

6. The process of claim 5 wherein the alcohol is 2-ethylhexanol.

7. The process of claim 5 wherein the glycol is 2-methyl-1,3-propanediol.

8. A process comprising:

(a) reacting one equivalent of an aromatic dicarboxylic acid derivative with about two equivalents of 2-methyl-1,3-propanediol to produce an ester diol; and (b) reacting one equivalent of the ester diol with from about 1.2 to about 1.5 equivalents of maleic anhydride to produce an unsaturated polyester having a fumarate/maleate ratio of 95/5 or greater.

9. The process of claim 8 further comprising capping the unsaturated polyester with a capping agent selected from the group consisting of alcohols, glycols, olefins, amines, diamines, and mixtures thereof.

10. A process comprising:

(a) reacting one equivalent of an aromatic dicarboxylic acid derivative with about two equivalent of a glycol mixture comprising 2-methyl-1,3-propanediol to produce an ester diol; and (b) reacting one equivalent of the ester diol with from about 1.1 to about 1.9 equivalents of maleic anhydride to produce an unsaturated polyester having a fumarate/maleate ratio of 90/10 or greater.

11. The process of claim 10 wherein the fumarate/maleate ratio is about 95/5 or greater.

12. The process of claim 10 wherein the glycol mixture further comprises a glycol selected from the group consisting of ethylene glycol, diethylene glycol, triethylene glycol, propylene glycol, dipropylene glycol, tripropylene glycol, 1,3-propanediol, 2,2-dimethyl-1,3-propanediol, and 1,6-hexanediol, and 1,4 cyclohexanedimethanol.

13. The process of claim 10 further comprising capping the unsaturated polyester with a capping agent selected from the group consisting of alcohols, glycols, olefins, amines, diamines, and mixtures thereof.

14. An unsaturated polyester consisting essentially of recurring units of an aromatic dicarboxylic acid, 2-methyl-1,3-propanediol, maleic acid, and fumaric acid, wherein the ratio of fumarate to maleate is 90/10 or greater.

15. The unsaturated polyester of claim 14 wherein the aromatic dicarboxylic acid is isophthalic acid.

16. A thermosetting composition comprising the unsaturated polyester of claim 14 and a monomer selected from the group consisting of vinyl aromatics, acrylates, methacrylates, vinyl ethers, vinyl esters, and mixtures thereof.

17. A thermoset polymer prepared from the thermosetting composition of claim 16.

18. The thermosetting composition of claim 16 wherein the monomer is styrene.

19. A thermoset polymer prepared from the thermosetting composition of claim 18.

20. A thermosetting composition comprising the unsaturated polyester of claim 15 and a monomer selected from the group consisting of vinyl aromatics, acrylates or methacrylates, vinyl ethers or vinyl esters, and mixtures thereof.

21. The thermosetting composition of claim 20 wherein the monomer is styrene.

22. A thermoset polymer prepared from the thermosetting composition of claim 20, having a DTUL of greater than 77° C.

23. A thermoset polymer prepared from the thermosetting composition of claim 20, having a DTUL of 90° C. or greater.

24. A composite comprising the thermosetting composition of claim 20.

* * * * *